United States Patent
Sander (10) Patent No.: US 7,714,866 B2
(45) Date of Patent: May 11, 2010

(54) RENDERING A SIMULATED VECTOR MARKER STROKE

(75) Inventor: Nikolai Sander, Fairfax, CA (US)

(73) Assignee: Autodesk, Inc., San Rafael, CA (US)

( * ) Notice: Subject to any disclaimer, the term of this patent is extended or adjusted under 35 U.S.C. 154(b) by 833 days.

(21) Appl. No.: 11/458,465

(22) Filed: Jul. 19, 2006

(65) Prior Publication Data

US 2008/0018650 A1     Jan. 24, 2008

(51) Int. Cl.
*G06T 11/20* (2006.01)
(52) U.S. Cl. ..................................... 345/441
(58) Field of Classification Search ............... 345/441, 345/442, 443
See application file for complete search history.

(56) References Cited

U.S. PATENT DOCUMENTS

| | | |
|---|---|---|
| 4,941,193 A | 7/1990 | Barnsley et al. |
| 4,970,666 A | 11/1990 | Welsh et al. |
| 5,847,712 A | 12/1998 | Salesin et al. |
| 5,982,383 A | 11/1999 | Kumar et al. |
| 6,007,338 A | 12/1999 | DiNunzio et al. |
| 6,031,541 A | 2/2000 | Lipscomb et al. |
| 6,128,019 A | 10/2000 | Crocker et al. |
| 6,202,073 B1 | 3/2001 | Takahashi |
| 6,226,015 B1 | 5/2001 | Danneels et al. |
| 6,256,039 B1 | 7/2001 | Krishnamurthy |
| 6,268,865 B1 | 7/2001 | Daniels et al. |
| 6,330,005 B1 | 12/2001 | Tonelli |
| 6,373,499 B1 | 4/2002 | Acker |
| 6,426,748 B1 | 7/2002 | Megahed |
| 6,556,196 B1 | 4/2003 | Blanz et al. |
| 6,628,279 B1 | 9/2003 | Schell et al. |
| 6,813,042 B2 | 11/2004 | Hawksworth et al. |
| 6,870,550 B1 | 3/2005 | Schuster et al. |

(Continued)

FOREIGN PATENT DOCUMENTS

EP     1189176     3/2002

OTHER PUBLICATIONS

Curtis, C.J. et al., "Computer-Generated Watercolor," International Conference on Computer Graphics and Interactive Techniques, Proceedings of the 24th annual conference on Computer graphics and interactive techniques, pp. 421-430 (1997).

(Continued)

*Primary Examiner*—Jeffery A Brier
(74) *Attorney, Agent, or Firm*—Gates & Cooper LLP (57) ABSTRACT

An apparatus, method, and article of manufacture are configured to display a vector marker stroke. A stroked fill of vector splines and polygons having faces along the spline are created based on a user input marker stroke. A stencil buffer is created indicating the number of vector faces incident at each pixel. When the number indicates that a pixel has overlapping faces, a pixel shader (that determines an opacity value for the pixel in a mask) is executed as many times as the number. When the number indicates that a pixel has at least one face and is at a beginning or an ending of the stroke, the shader is executed to add to the opacity value. A blur shading operation is executed on each of the pixels. The stroked fill is rendered and a wet color is rendered, using the mask, on top of the stroked fill.

12 Claims, 7 Drawing Sheets

U.S. PATENT DOCUMENTS

| | | | |
|---|---|---|---|
| 6,912,293 | B1 | 6/2005 | Korobkin |
| 6,917,369 | B2 | 7/2005 | Perry et al. |
| 7,038,694 | B1 | 5/2006 | Santodomingo et al. |
| 7,050,067 | B2 | 5/2006 | Raubacher et al. |
| 7,061,501 | B1 | 6/2006 | Lake et al. |
| 7,190,376 | B1 | 3/2007 | Tonisson |
| 7,360,175 | B2 | 4/2008 | Gardener et al. |
| 2002/0059337 | A1 | 5/2002 | Takaoka et al. |
| 2002/0102989 | A1 | 8/2002 | Calvert et al. |
| 2003/0011599 | A1 | 1/2003 | Du |
| 2003/0058241 | A1 | 3/2003 | Hsu |
| 2004/0263512 | A1 | 12/2004 | Santodomingo et al. |
| 2005/0108215 | A1 | 5/2005 | Thomas et al. |
| 2005/0122334 | A1 | 6/2005 | Boyd et al. |
| 2005/0166138 | A1 | 7/2005 | Kundu |
| 2005/0190181 | A1 | 9/2005 | Sakagawa et al. |
| 2005/0225552 | A1 | 10/2005 | Anand |
| 2006/0114262 | A1 | 6/2006 | Yamauchi et al. |

OTHER PUBLICATIONS

"The Prologue Battle," http://web.archive.org/web/*/http://lsdis.cs.uga.edu/~cthomas/courses/anim/slides/lotr_prologue_battle.html, Jun. 10, 2004.

"Flash Symbols," Smartwebby.com, http://web.archive.org/web/20050428080422/http://www.smartwebby.com/Flash/flash_symbols.asp (http://web.archive.org/web/*/http://www.smartwebby.com/Flash/flash_symbols.asp), Apr. 28, 2005.

Salisbury et al., "Interactive Pen-and-Ink Illustration," Mar. 1995, pp. 1-8.

Adobe Creative Team, "Adobe Photoshop 6.0 Classroom in a Book," Adobe Press, chapter 3, Dec. 28, 2000.

Shadow Caster User's Guide, "Sophisticated Drop Shadows and Effects for QuarkXPress," 37 pages, 2005.

SketchUp for Microsoft Windows User Guide, www.sketchup.com, pp. 38-40, 71, 251, 252, 324 and 364, 2005.

Reeves et al., "Rendering Antialiased Shadows with Depth Maps," Computer Graphics, 21(4):283-291, Jul. 1987.

Salisbury et al., "Orientable Textures for Image-Based Pen-and-Ink Illustration," ACM International Conference on Computer Graphics and Interactive Techniques, 1997, pp. 1-6.

Fabris et al., "An Efficient Filling Algorithm for Non-Simple Closed Curves Using the Point Containment Paradigm," IEEE, 1997, pp. 2-9.

RENDERING A SIMULATED VECTOR MARKER STROKE

CROSS-REFERENCE TO RELATED APPLICATIONS

This application is related to the following co-pending and commonly-assigned patent applications, which applications are incorporated by reference herein:

U.S. patent application Ser. No. 11/268,797, entitled "AUTOMATIC ELEMENT SUBSTITUTION IN VECTOR-BASED ILLUSTRATIONS", by Mason J. Foster, filed on Nov. 8, 2005;

U.S. patent application Ser. No. 11/268,796, entitled "DRAWING STYLE DOMAINS", by Mason J. Foster, Jose Madeira de Freitas Garcia, and Joseph Cleveland Ard, filed on Nov. 8, 2005;

U.S. patent application Ser. No. 11/286,658, entitled "CASTING SHADOWS", by Mason J. Foster, filed on Nov. 23, 2005; and U.S. patent application Ser. No. 11/286,535, entitled "STROKED FILL", by Nikolai Sander and Mason J. Foster, filed on Nov. 23, 2005.

BACKGROUND OF THE INVENTION

1. Field of the Invention

The present invention relates generally to computer animated drawings (CAD) such as architectural renderings mechanical drawings, GIS drawings etc., and in particular, to a method, apparatus, and article of manufacture for modeling/simulating a magic marker stroke in such a drawing.

2. Description of the Related Art

In the architectural, engineering, and construction (AEC) fields, computer aided design (CAD) drawings are often used to design blueprints, drawings, plans, etc. However, such CAD drawings may be complex, confusing, and fail to provide an end-user (e.g., a potential client of an architect) with a drawing or visualization of the "intent" of the architect or designer. Architectural renderings are designed to illustrate the "intent" of the designer or architect, as opposed to showing precise fidelity. In these renderings, the illustrator may want to simulate or model natural media materials and strokes—such as those made by pencils and markers. For example, a simulation of a marker may need to simulate the effects of saturated ink at certain points of the stroke. However, prior art programs fail to provide the ability to present such natural media materials or marker strokes in a vector environment. Instead, the prior art identifies where a stroke is located on a large bitmap/grid and calculates the flow of ink and the distribution of the ink depending on various variables on the bitmap grid using some type of dynamic calculation. Such problems may be better understood with a description of prior art drawing software and methodologies.

CAD programs provide high fidelity drawings that fail to provide a visualization of the intent of the user. Such CAD programs or other drawing programs may be vector-based or raster-based. It may be possible to achieve hand-drawn effects in raster-based drawing programs. For example, in a raster-based program, a bitmap stroke may be created that appears hand-drawn (e.g., using a variety of raster-based drawing/paint tools). However, it may be preferable to work in a vector-based drawing. For example, in vector-based drawing programs, a user may work with modifiable shapes that can be edited, resized, and rearranged. Nonetheless, the inherent mathematical description of vector shapes lends itself to the production of hard-edged, non-organic artwork. Thus, it has always been a challenge for digital artists to achieve natural hand-drawn effects in a vector-based drawing program.

There are a number of domains, architecture being one, where there is a need to be able to create natural-looking renderings of (inherently) geometric hard-edged drawings. In this regard, architectural renderings may take a variety of forms or styles, from hand-drawn renderings, to cartoon-like rendering, to ultra-realistic 3D rendering. In an architectural rendering, it's less important to be geometrically accurate, and more important for the drawing to be able to evoke the "spirit/goals" of the project.

While the prior art has attempted to create vector-based strokes that appear organic, the prior art has failed to provide the ability to simulate or model natural media materials such as for a magic marker. In a vector environment, achieving the look of marker strokes is challenging, because when strokes overlap, there is a higher saturation of ink in the overlap area (and, consequently a darker color). Additionally, ink bleeds from the overlap area into adjacent stroke areas. A challenge of modeling this is determining the location and nature of the overlap areas with rendering techniques that allow the strokes to be modified in near-real time.

In view of the above, marker strokes are typically simulated in a raster-based environment using a single large bitmap. However, such prior art simulations are slow due to the amount of processing that must be performed. Thus, prior art marker stroke techniques fail to achieve an easy, intuitive, fast, vector-based modifiable means for providing a hand-drawn look of a marker stroke.

Another natural media material that some systems attempt to simulate is that of water colors. However, water colors are often used in a two-dimensional environment. Further, while in a 2D environment, 3D meshes are used to render the water colors. In this regard, the faces that are used to generate water colors are flat faces wherein vertices of a stroke all have the same z-value. Nonetheless, despite the use of a single plane on which all vertices exist, a 3D mesh is still utilized to render the water colors.

Another approach in rendering images utilizes shaders. A shader is a computer program used in 3D computer graphics to determine the final surface properties of an object or image. A shader often includes arbitrarily complex descriptions of various properties such as light absorption, reflection, refraction, shadowing, etc.

Various types of shaders exist. A vertex shader is applied for each vertex and runs on a programmable vertex processor. Vertex shaders define a method to compute vector space transformations and other linearizable computations. A pixel shader is used to compute properties that, most of the time, are recognized as pixel colors. Pixel shaders are applied for each pixel and are run on a pixel processor that usually features more processing power than a vertex-oriented processor.

User-based strokes may be presented in the form of one or more faces. The faces may be rendered using a shader (e.g., a pixel shader) that works locally on each point that is rendered. In this regard, given the location of one point on a surface, the shader returns the color on that point. In addition, shading algorithms are often based on the concept of multiple passes. A shader, at its highest level, is a description of how to render an object multiple times to achieve a particular effect that is not possible with only a single rendering pass. Multiple passes can describe more complex effects than single passes since each rendering pass can be different from the other rendering passes. The results of each pass are combined in the frame buffer with the previous passes. For example, if it is desirable to render an object with two textures but the hardware only supports the ability to render one texture at a time, the object can be rendered once for each texture (i.e., a pass is performed for each texture) and the results are added together.

As described above, when attempting to simulate marker strokes (also referred to as wet strokes), the prior art utilizes a large bitmap in which neighbor information can be used to perform a dynamic simulation of the fluid on the virtual paper. However, if you have a shader that works on a surface, such neighbor examination is more difficult or impossible. In a shader, one cannot examine neighboring pixels during a single pass of the shader. Instead of rendering to the frame buffer that is presented to the user (i.e., rendering to the screen), a pass renders to an off-screen texture. In subsequent passes, the previously rendered bitmaps may be sampled/examined (e.g., given a particular UV coordinate, the value of the texture can be looked-up). However, there is no mechanism for obtaining the value of neighboring pixels in the same/current pass.

Accordingly, what is needed is a way to simulate/model a marker stroke in an object-based vector drawing program in an efficient, expeditious manner.

SUMMARY OF THE INVENTION

One or more embodiments of the invention provide the ability to quickly and efficiently render a vector marker stroke in a vector-based drawing program. The stroke rendering is essentially broken into two components:

(1) A local shader that works on the vector stroke itself, and (2) A "global" component that renders the overlap and bleed areas.

The local component models a semi-transparent color and is applied to the stroke trajectory as a 3D shader without a depth component. This is referred to as the "dry" color. Stroke width, opacity and a variety of other parameters may be controlled (e.g., by a user).

To simulate the distribution of the liquid in the overlap areas, the global component calculates/creates an accumulation buffer that characterizes areas of higher liquid deposition due to overlapping strokes, areas of higher liquid deposition due to time effects such as the beginning and ending of strokes, and areas where liquid bleeds into adjacent areas of the page.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a method, apparatus, system, technique, etc. for modeling/simulating a marker/magic marker natural media material in a vector-based drawing program.

As indicated above, in a vector environment, achieving the look of marker strokes is challenging, because when strokes overlap, there is a higher saturation of ink in the overlap area (and, consequently a darker color). Additionally, ink bleeds from the overlap area into adjacent stroke areas. A challenge of modeling this is determining the location and nature of the overlap areas with rendering techniques that allow the strokes to be modified in near-real time.

To accurately and efficiently model a marker stroke, the invention breaks the stroke rendering into two (2) components: A local shader that works on the vector stroke itself, and a "global" component that renders the overlap and bleed areas.

The local component models a semi-transparent color and is applied to the stroke trajectory as a 3D shader without a depth component. This is referred to as the "dry" color. Stroke width, opacity and a variety of other parameters may be controlled.

To simulate the distribution of the liquid in the overlap areas, an accumulation buffer is calculated which characterizes the following: areas of higher liquid deposition due to overlapping strokes; areas of higher liquid deposition due to time effects such as the beginning and ending of strokes; and areas where liquid bleeds into adjacent areas of the page.

Hardware and Software Environment

Figure 1:
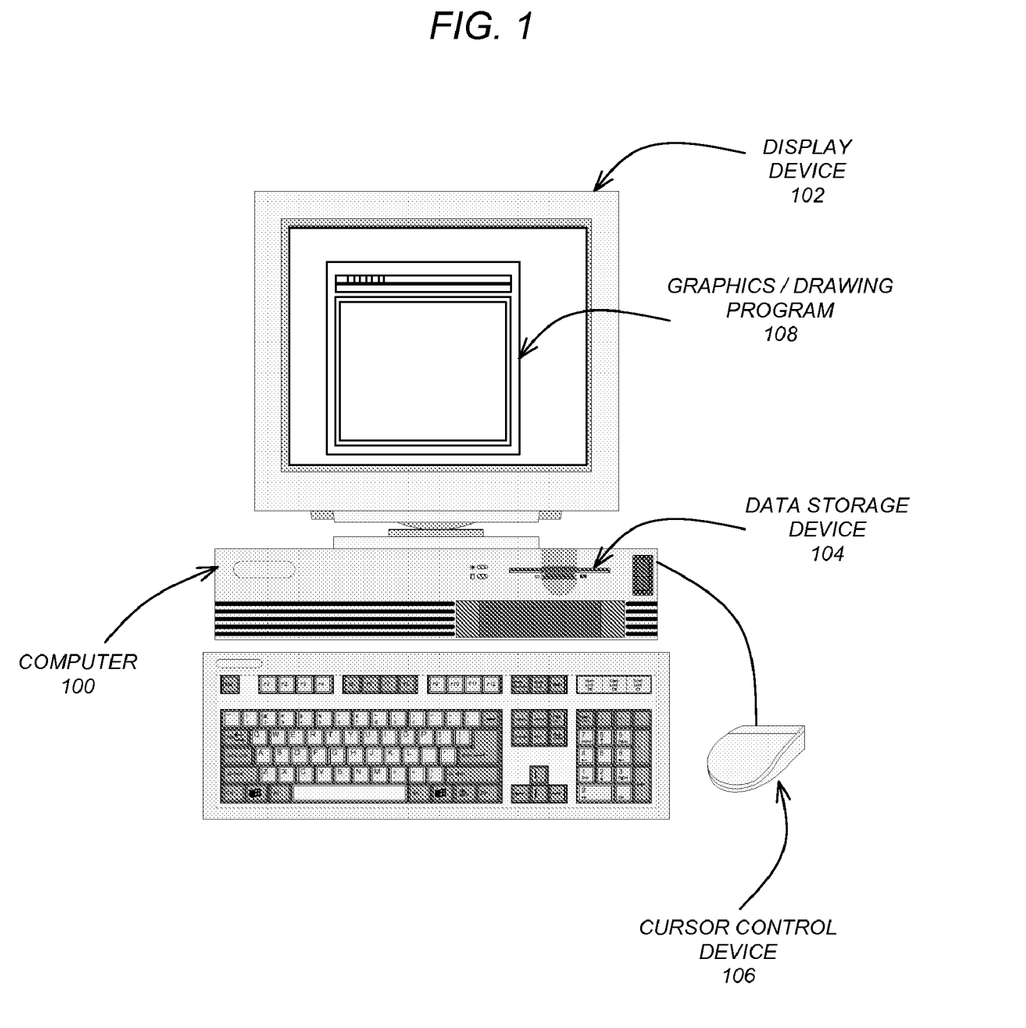
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Rendering Software

In one or more embodiments of the invention, graphics program 108 is a vector-based drawing application (e.g., an architectural renderer) that provides a rendering (e.g., hand-drawn, cartoon-like, ultra-realistic 3D content) of a drawing. Another graphics program 108 may consist of a more precise fidelity application such as a CAD application.

Figure 2:
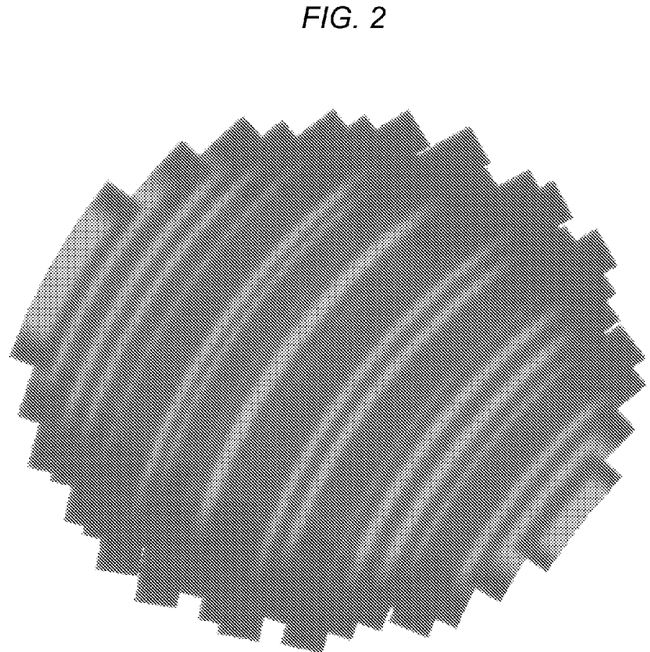
FIG. 2 illustrates a vector marker stroke displayed in accordance with one or more embodiments of the invention.

To provide the modeling/simulation of a vector marker stroke as illustrated in FIG. 2, the strokes are first rendered into a bitmap where the pixel values are incremented each time a stroke covers that pixel. Thus a pixel which was covered by two strokes would have a value of two. Areas where the tip of the marker lingers are incremented as well to reflect the additional liquid released when the marker is moving slowly (such as the start and end of the stroke). This bitmap is then blurred with a convolution kernel under user control to simulate the degree to which the accumulated liquid flows into neighboring pixels. This blurring operation can be performed in hardware or software.

The result of the bitmap operations creates an alpha channel that is used to blend the wet color on top of the dry color. Additional mask area may be added to the beginning or end of the stroke (which are typically wetter than the mid stroke).

A special technique may need to be used when zooming in or out. Since the blur is done in hardware to achieve real-time rendering, zooming-in would, theoretically, require the blur kernel to be extremely large, resulting in slow rendering times, if they could even be accomplished on the video card. To get around this issue, the program trades off the size of the blur kernel against the resolution of the alpha mask. When the user zooms far in, the program calculates how big the kernel needs to be (e.g., 100 pixels). The buffer is then scaled down according to an algorithm that trades off kernel size vs. resolution and hardware-blurred appropriately. Pixels from the scaled down alpha channel are referenced using their (U,V) coordinate and retrieved to blend in the wet color.

The above-described use of the bitmaps and rendering is described in more details hereafter.

In a drawing application such as an architectural renderer, the user may elect to draw using a marker natural media material. The user utilizes a cursor control device 106 (e.g., a mouse or a pen tablet) to draw the appropriate strokes within the rendering (i.e., comprised of vector geometry and various pixels). The question arises as to how to process and display the stroke on the display device 102. Upon receiving the input via the cursor control device 106, the application 108 processes the input as a stroked fill. Such a stroked fill is described in further detail in co-pending U.S. patent application Ser. No. 11/286,535, entitled "STROKED FILL", by Nikolai Sander and Mason J. Foster, filed on Nov. 23, 2005. The stroked fill generates vector based splines along distributed/parallel lines that are inside of a binding geometry.

Vector-based polygons are then created along the splines to provide a thickness to the stroke. Accordingly, the application 108 obtains a set of parallel polygons that fill a certain bounding area. The invention then provides the ability to render the polygons using Direct3D™ available from Microsoft™ or via other hardware/software based applications. Direct3D™ (also referred to as DirectX™ technology) is an advanced suite of multimedia application programming interfaces (APIs) built into an operating system that provides a standard development platform that enables developers to access specialized hardware features (e.g., 3D graphics acceleration chips and sound cards) without having to write hardware-specific code. The API controls low-level functions including 2D graphics acceleration, support for input devices (e.g., mice and pen tablets), and control of sound mixing and sound output. In addition to the above, other graphics languages such as OpenGL™ may also be used in accordance with embodiments of the invention.

The invention defines multiples passes that are rendered using the geometry of the stroke (i.e., the set of parallel polygons). The stroke material (i.e., a marker) is then applied to the set of faces/set of polygons using a shader (e.g., via the Direct3D™ interface) (e.g., a pixel shader or a vertex shader). Each pass may utilize a different shader.

Rendering Pass One—Rendering to the Stencil Buffer

As part of the rendering process, the invention utilizes the stencil buffer. A stencil buffer is an extra buffer, in addition to the color buffer (pixel buffer), and depth buffer (z-buffer) found on computer graphics hardware that is extremely fast to use. The buffer is per pixel and works on integer values. The stencil buffer is not directly visible, has no single purpose but can be used for a variety of different purposes. The stencil buffer can be used to perform a mathematical comparison (e.g., equality, greater-than, less-that, etc.) between the stencil buffer and a user-supplied value. The user can also specify an operation to be performed based on the results of the mathematical comparison.

The present invention utilizes the stencil buffer to render not only where the faces overlap but also how often they overlap. In this regard, the stencil buffer of the present invention is similar to a bitmap that contains values that are used in different operations. To utilize the stencil buffer in subsequent passes, the stencil buffer must first be created. Thus, once the splines/polygons have been obtained/input from the user, the application 108 begins the rendering process by creating the stencil buffer during a first rendering pass.

As described above, the stencil buffer contains a number of faces that are incident at each pixel. Thus, the stencil buffer may be viewed as a large bitmap that has pixels and information regarding how many faces are incident at each pixel on the bitmap (i.e., how many overlapping faces exist from the dry stroke of the marker by the user). If there is one polygon at a pixel, there is one (1) face at that point/pixel; if there are two (2) polygons overlapping each other, the value would be two (2) for that pixel. The values for every pixel in the stencil buffer are initialized to zero (0). When the stroke is drawn, the faces and strokes are rasterized into a bitmap and a scanline algorithm processes the bitmap (e.g., in Direct3D™). Each time the scanline algorithm detects a face at a particular pixel, the current value in the stencil buffer for that pixel is increased by one (1). The result is a stencil buffer that contains numbers for each pixel in the rendering that contains information regarding how many faces exist at each pixel.

The above-described stencil buffer creation operation may also utilize/define a stencil operation that increases the value in the stencil buffer. Thereafter, every time a face is rendered at a pixel or every time the scanline algorithm determines a face exists at a certain pixel, the stencil operation is called. In this regard, if there are two faces, the stencil operation is executed twice.

Second Pass—Creating the Alpha Mask/Accumulation Buffer

The stencil buffer created in the first pass is not actually rendered to a display device 102. Instead, the stencil buffer is used to create a mask/accumulation buffer in subsequent passes that are eventually used to produce to the actual rendering. Similarly, the alpha mask/accumulation buffer created in the second pass is not actually displayed. Instead, the alpha mask is used in subsequent passes to render the image to the display device 102.

In the second pass, a shader (i.e., a pixel shader) is called to initialize the alpha mask/accumulation buffer with those locations having overlapping faces. In this regard, the second pass produces a value in the alpha mask for every pixel that has overlapping faces. To determine if a pixel has an overlapping face, the stencil buffer is compared to the value two (2) (i.e., for two or more faces). Thus, all pixels that have zero (0) or one (1) face are ignored in this pass. If a pixel has overlapping faces, the pixel shader is called which adds a value to the alpha mask/accumulation buffer for the image. Further, the pixel shader is called as many times as the number that is stored in the stencil buffer for the pixel. Every time the pixel shader is called, it produces a grayscale value in the mask that reflects the amount of faces that overlap at a given pixel. The result provides for a mask with darker opacity (i.e., wetter or more ink) in areas with overlapping faces. The amount of opacity added may be user settable. For example, if the grayscale value that gets added is 0.2, a pixel that has 5 overlapping faces is fully saturated (white). If the geryscale value is 0.5 a pixel with 2 overlapping faces is fully saturated. This way the user can adjust how wet and saturating the marker is.

Figure 3:
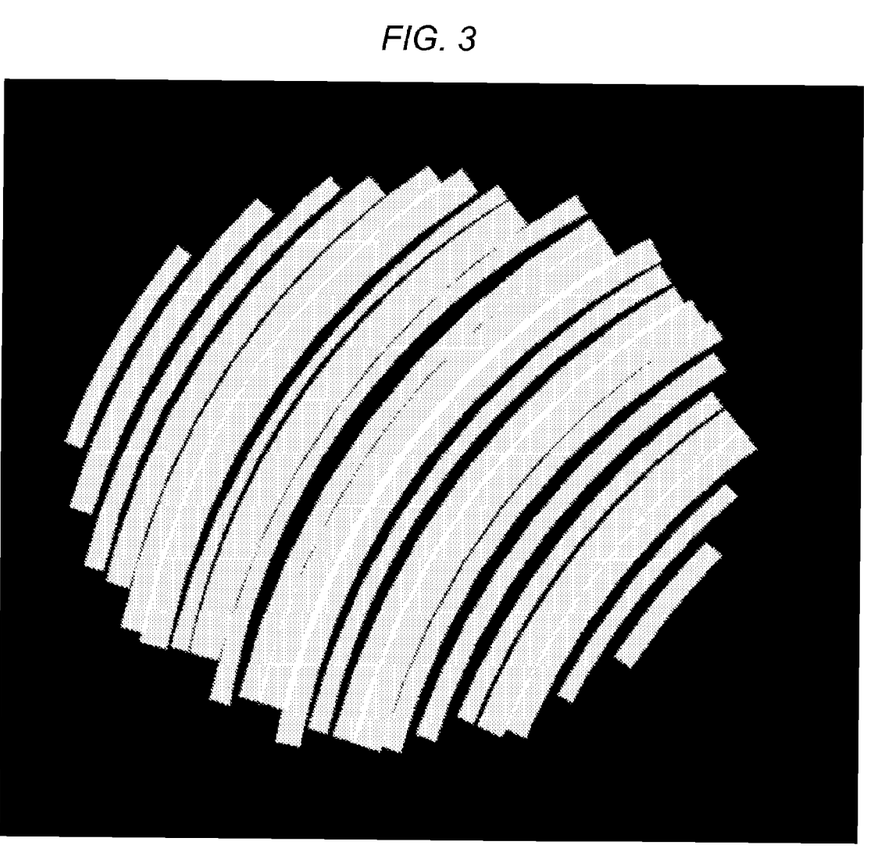
FIG. 3 illustrates a mask (e.g., the output) from an initial rendering pass in accordance with one or more embodiments of the invention.

FIG. 3 illustrates the mask (e.g., the output) from the second pass. As can be seen in FIG. 3, the white represents opacity for each stroke and the black represents transparency. Thus, wherever you have overlapping strokes, the mask is more opaque and the eventual image will not be highly visible underneath the mask/marker strokes. However, the black transparent sections will allow the underlying image to be seen.

Third Pass—Supplementing the Mask with Marker Bleed

As described above, the result of the second pass provides a bitmap with different gray scale values for different faces depending on how much the faces overlap at a given pixel. Typically, when a marker stroke is drawn, the beginning and end of the stroke are darker because the marker is typically slower in speed when an artist begins and ends a stroke. Such a decrease in speed of the stroke results in bleeding of the liquid (i.e., the deposit of more ink onto a drafting paper/desktop) at the beginning and end of the stroke.

To account for such additional liquid deposits, the program 108 must determine when the beginning and end of the stroke is. Initially, the application 108 examines the stencil buffer to determine if any face exists at a give pixel (i.e., a value of one (1) or more in the stencil buffer). Thus, the third pass examines both overlapping faces (i.e., a value of two or more in the stencil buffer) and pixels with only one face (i.e., a value of one or more in the stencil buffer).

Once a pixel having a face is identified, the UV coordinate for the identified pixel is retrieved. The UV coordinate identifies where on the current stroke the pixel is actually located. UV coordinates go from 0-1 in the X and 0-1 in the Y directions. In this regard, at one end of a stroke, the U-value is 0, the midpoint of the stroke is 0.5 and the end of the stroke is 1. Thus, the closer the (U,V) coordinates are to (0,0) and (1,1), the closer the pixel is located at the beginning or end of a stroke.

Further, one or more embodiments may determine the location of the stroke in paper space. In such an embodiment, the UV coordinate may be divided by the length of the stroke and then compared to a reference value in pt (e.g., 1/72 inch). Accordingly, the amount of start and end bleeding is not dependent on the length of the stroke but only by the distance in paper space (in pts) that is declared by the user.

The (U,V) coordinates are used as input into the pixel shader that is called for the given pixel. The pixel shader uses the (U,V) coordinates to determine the distance from (0,0) and (1,1) to evaluate how close the pixel is to the beginning and end of the stroke. The level of closeness that is used may also be provided by the user as an additional parameter. In this regard, the user can change how far the bleeding will go into the stroke (e.g., in paper space).

In one example, if the user specifies 50% (i.e., the middle of the stroke), the (U,V) coordinate may be multiplied by 0.5 to be used in a linear blend operation. Thus, a linear blend is performed based on the value of the (U,V) coordinate and the bleeding parameter.

In another example, at a point A, the (U,V)=(0.1,0.7) lies on a stroke with a length of 3 inches (=216 pt). The distance from 0 is 0.1 in the U direction and 0.7 in the V direction. To find out the distance of the U value in pt we multiply 216 pt by 0.1=21.6 pt. If the user indicates 40 pt as the bleeding parameters, the U-value for 40 pt is obtained by dividing 40 by 216=0.185. The color value at the U coordinate of 0.1 is obtained by linearly blending from 0 to 0.185 from black (transparent) to white (opaque). Thus, the resulting pixel value is (UV−UVBlack)/(UVWhite−UVBlack)*WhiteColor=(0.1−0.0)/(0.185−0.0)*1=0.54. The resulting value is then added to the bitmap/mask/accumulation buffer that was rendered in pass 2.

In another example, if the shader is called at point B, and the U-value is 0.05, the value is closer to the beginning of the stroke and therefore the opacity value should be higher/darker at this point (as well as at the end of the stroke).

In view of the above, each point in a stroke has a (U,V) coordinate that is passed into the shader. The shader calculates the color (i.e., opacity value) depending on the linear blend parameter (e.g., provided by the user) and the distance from the start and end of the stroke. The color is then added to the mask/accumulation buffer.

Figure 4:
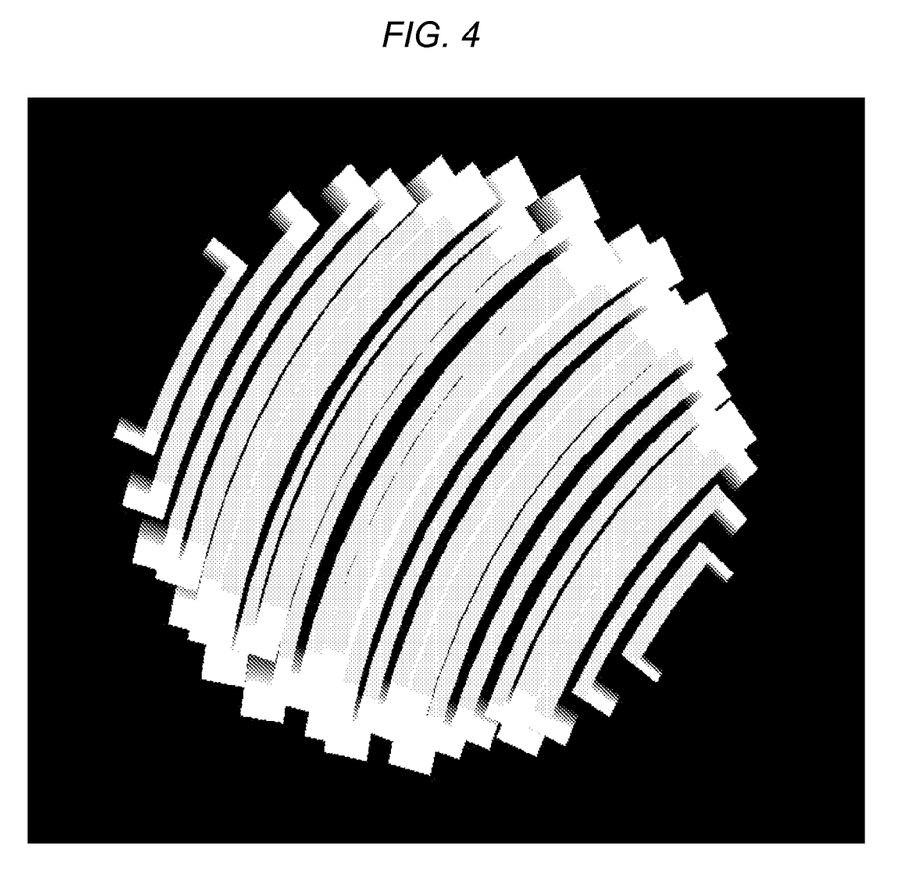
FIG. 4 illustrates the output of a mask from a subsequent rendering pass indicating saturation at the beginning and end of each stroke in accordance with one or more embodiments of the invention.

FIG. 4 illustrates the output of the mask from rendering pass three. As can be seen, the beginning and end of each stroke now have what looks like brackets. The brackets represent the saturation of ink (i.e., bleeding) at the beginning and ending of each stroke. The liquid deposition is now higher (resulting in a higher opacity) and darker at the beginning and end of each stroke (as well as during overlapping faces produced during the second pass).

Passes Four and Five—Blurring

In addition to a higher concentration of ink at the beginning, end, and at overlapping faces of one or more strokes, ink from marker may also blur into neighboring parts of the paper/drawing surface. Passes four and five account for such bleeding into neighboring pixels by applying a blur filter/shader to the mask/accumulation buffer.

Pass four blurs the mask/accumulation horizontally and pass five blurs the mask/accumulation buffer vertically. Such a blurring may be a 2D Gaussian blur or any other type of blur operation (e.g., a constant blur).

Further, when zooming in or out of an image, a special technique may be necessary to conduct the blur operation. For example, since the blur may be performed in hardware to achieve real-time rendering, zooming-in, could, theoretically, require the blur kernel to be extremely large, resulting in slow rendering times (if possible to accomplish at all on the graphics hardware/video card). In this regard, as the kernel increases in size, more look-ups and operations must be performed and the software slows down. To avoid this issue, the invention may trade off the size of the blur kernel against the resolution of the alpha mask. If the size of the kernel is increased, the resolution of the bitmap/alpha mask is decreased. With a lower resolution, the result is less accurate but the kernel covers more of the actual area.

In view of the above, when the user zooms far in, the program may calculate how big the kernel needs to be (e.g., 100 pixels). The buffer may then be scaled down according to an algorithm that trades off kernel size versus resolution, and hardware-blurred appropriately. Pixels from the scaled down alpha channel are then referenced using their (U,V) coordinate and retrieved to blend in the wet color.

Thus, the kernel size determines the number of neighboring pixels that are examined/part of the blur operation. In one or more embodiments, six (6) different kernel sizes may fit into a pixel shader (e.g., 1, 3, 5, 7, 9, and 11 pixels). The kernel size may first be calculated based on the lowest error of the six sizes (i.e., that the pixel shader can process without significant slowing or error). Once the kernel size is determined, the mask size that is needed for the given kernel size is calculated. Thus, the application first attempts to utilize the largest kernel and only when the largest requested kernel size cannot be used is the mask down sampled/sized.

Once the kernel size is determined, the color value of the pixel (i.e., the value from the mask/accumulation buffer) is retrieved and multiplied with a certain weight (all weights add up to 1.0 and the type of blur determines the actual weights [Gaussian, constant etc.]). Accordingly, each pixel value in the mask is replaced by the weighted average of its neighbors. Thus, each pass looks at a number of neighboring pixels that is dependent on the kernel size. Further, as described above, if one were to zoom into the geometry, a much bigger kernel size would be needed because the ink would bleed into more of the enlarged pixels. Accordingly, the above-identified calculation may be performed to determine the appropriate kernel and mask size.

Figure 5:
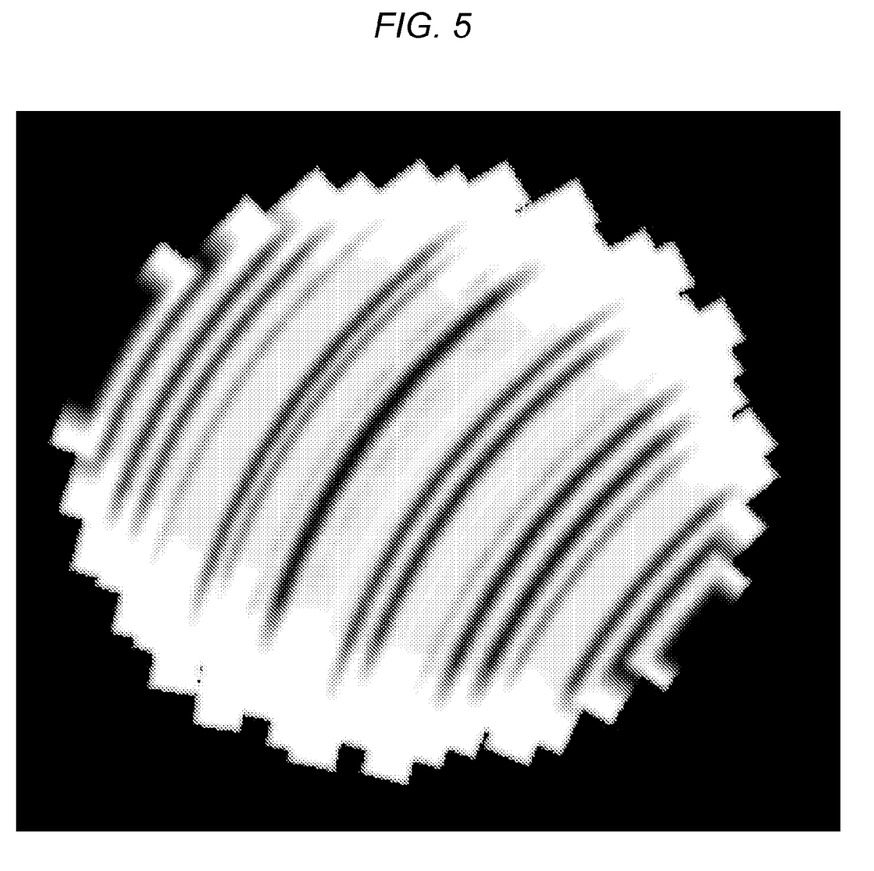
FIG. 5 illustrates the result/output of the mask pursuant to further rendering passes wherein faces have been blurred in accordance with one or more embodiments of the invention.

FIG. 5 illustrates the result/output of the mask subsequent to passes four and five. As can be seen, there is an image with the overlapping faces and the start and end of the strokes blurred. The brackets (representing the beginning and end of the strokes) are still visible. Thus, only the saturated portion of the image has been blurred. In this regard, the portions in the middle of the stroke have not been blurred.

Passes Six and Seven—Rendering to the Display

Once the mask/accumulation buffer has been created and blurred from passes 1-5, the image is ready for rendering to the display device 102.

Figure 6:
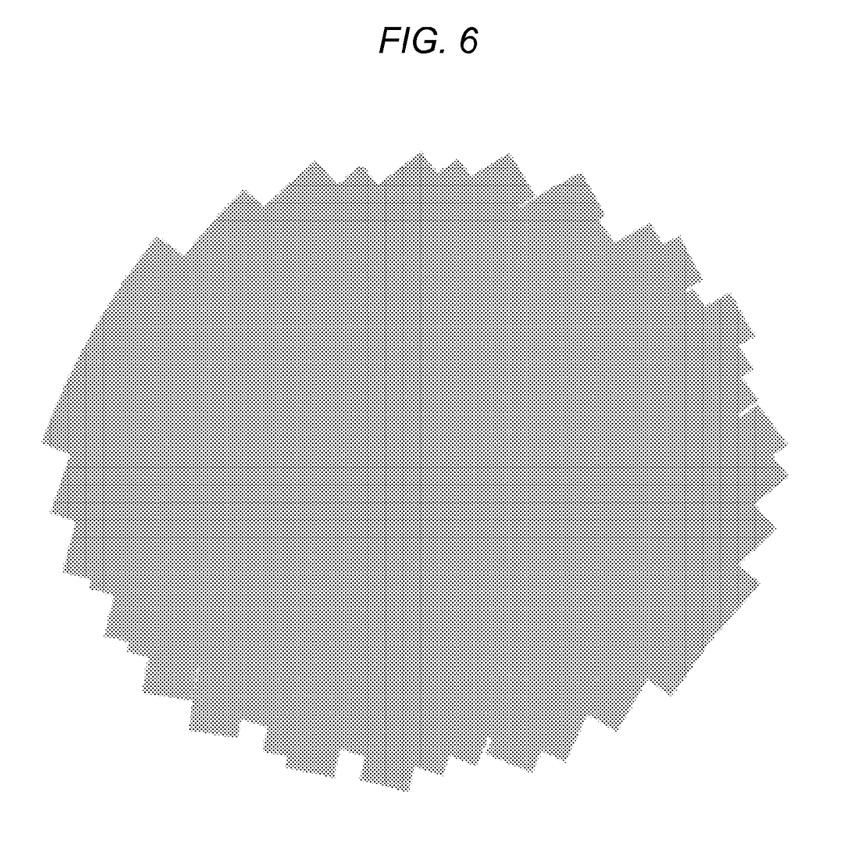
FIG. 6 illustrates the rendering to the display of the dry stroke in a given color in accordance with one or more embodiments of the invention.

In pass six, the base of the marker is rendered to the display 102. In this regard, the strokes are first rendered in a given/certain color as illustrated in FIG. 6. Thus, FIG. 6 illustrates the rendering to the display of the dry stroke in a given color. The same color is used throughout the rendering without any differences at the beginning, end, or overlapping areas of the image. The thickness, color, and other parameters that are rendered may be selected by the user. For example, to simulate the look of dry marker on paper a combination of high and low frequency Perlin noises (with possible skewing) is applied. In one or more embodiments, pre-defined papers are defined that the user can choose and that result in different values for the high and low frequency noise.

Pass 7 utilizes the mask illustrated in FIG. 6 to render the saturated ink portions of the image. In this regard, the alpha mask identifies the opacity values of the wet ink to be applied to the underlying image. FIG. 2 illustrates the rendering of the wet color using the mask on top of the rendering of FIG. 6. When the wet color, using the mask is rendered on top of the color of FIG. 6, the color applied using mask provides the effect of the marker stroke. In this regard, wherever the mask of FIG. 6 contains white portions, more of the wet ink is deposited and the color is more opaque on top of the color base strokes rendered. Similarly, wherever the mask of FIG. 6 is darker, the mask provides for more transparency and the color rendered using the mask (as illustrated in FIG. 2 can be seen in further detail). Such an application of the mask to the color of FIG. 6 may be performed by graphics hardware, using compositing software, or other techniques known in the art for rendering and working with alpha masks.

Logical Flow

Figure 7:
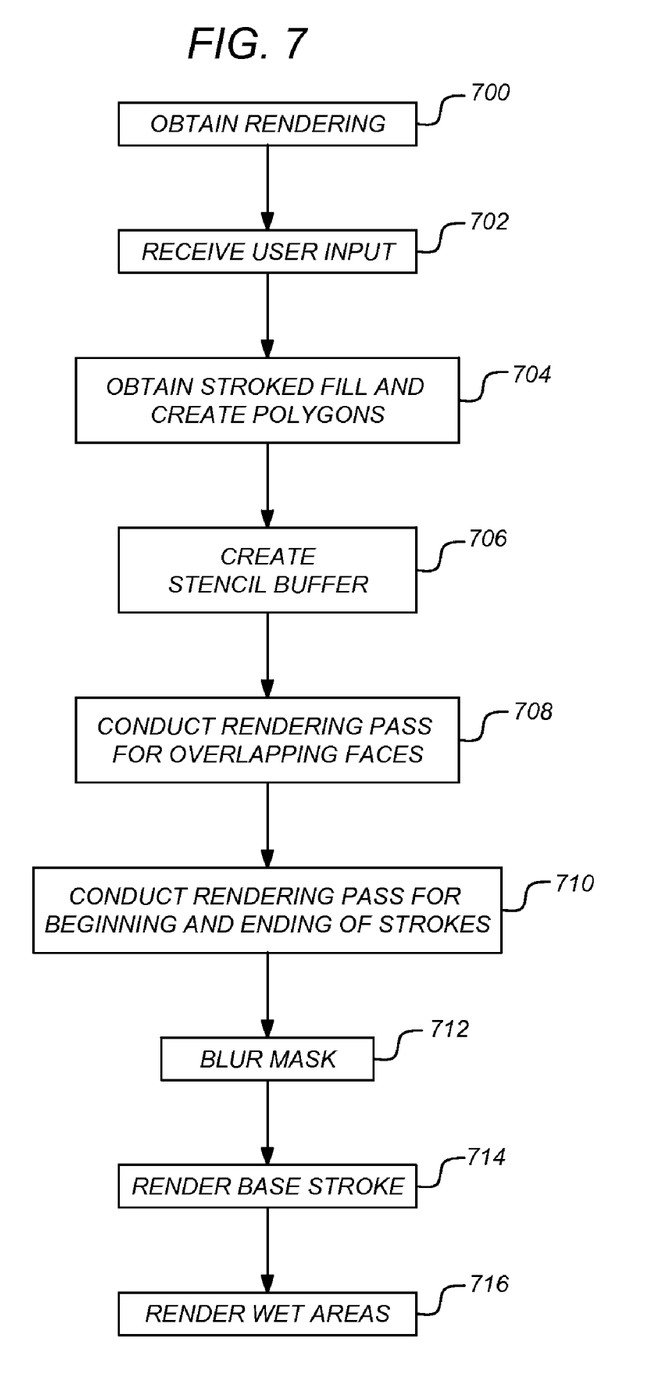
FIG. 7 illustrates the logical flow for displaying a vector marker stroke in accordance with one or more embodiments of the invention.

FIG. 7 illustrates the logical flow for displaying a vector marker stroke in accordance with one or more embodiments of the invention. At step 700, a computer-generated rendering comprised of vector geometry and one or more pixels is obtained.

At step 702, user input is received via a cursor control device. Such user input may comprise a marker stroke in the computer-generated rendering. In this regard, the marker stroke may consist of the manual creation of a spline by the user. Alternatively, the user may free-form draw a vector marker stroke (e.g., similar to a raster based draw operation), and the computer may automatically create the vector based splines without user input dynamically (or non-dynamically) as the stroke is drawn. At step 704, a stroked fill based on the marker stroke is obtained. The stroked fill is one or more vector splines. In addition, at step 704, one or more vector polygons are created along the vector splines. Such vector polygons have one or more faces. Thus, in steps 700-704, vector marker strokes are received as input from a user. In addition, the user may specify various parameters for the stroke such as color, stroke width, stroke style (e.g., jagged edge, straight edge, smooth edge, etc.).

In steps 706-712, an alpha channel/mask is created in an accumulation buffer that identifies areas of higher liquid deposition due to overlapping vector marker strokes, areas of higher liquid deposition due to time effects at the beginning and ending of strokes, and areas where liquid flows into adjacent areas of the drawing.

At step 706, a stencil buffer is created that consists of a number, for each of the one or more pixels (i.e., of the one or more vector faces) that are incident at each of the one or more pixels. To create the stencil buffer, a determination is made if each of the pixels contains one of the vector faces. If a pixel contains a vector face, a stencil operation is conducted for each of the faces contained at the pixel. The stencil operation increases a current value of the number in the stencil buffer for the given pixel. Thus, the stencil operation is called once for each face at each pixel (and can thereby be called multiple times for any given pixel). In view of the above, the vector marker strokes are rendered into a bitmap of pixels wherein the pixel values for the pixels in the bitmap are incremented each time the one or more vector marker strokes covers the pixels.

At step 708, a rendering pass is conducted to create a mask/alpha mask/accumulation buffer for the overlapping faces. In this regard, the number in the stencil buffer is examined of each of the one or more pixels, to determine whether each pixel has overlapping faces (e.g., if the number is two or more). If the number indicates that a pixel has overlapping faces, a pixel shader is executed for the pixel as many times as the number. The pixel shader determines an opacity value in the mask for the one pixel.

At step 710, a rendering pass is conducted for the beginning and ending of the strokes. As part of this rendering pass, the number in the stencil buffer is examined for each pixel to determine if a pixel has one or more faces. If a pixel has at least one face, a further determination is made regarding whether the pixel is at the beginning or ending of the marker stroke. If the pixel has at least one face and is at the beginning or ending of a marker stroke, a pixel shader is executed that further adds to the opacity value in the alpha mask (i.e., for the one pixel).

The determination regarding whether the pixel is at the beginning or ending of the stroke may utilize a UV coordinate of the pixel on the marker stroke to determine where on the vector marker stroke the pixel is located. The executing of the pixel shader may then pass the UV coordinate to the pixel shader which compares the UV coordinate to a user specified parameter (or default parameter that is/is not specified by the user) that defines how far bleeding goes into the marker stroke. In this regard, the user may select the speed at which ink flows from the virtual marker and/or the type of paper to determine the amount of ink bleeding/saturation that is to occur.

In view of the above, an alpha mask is created that indicates the pixel values for the pixels in a bitmap that reflects areas of higher liquid/ink deposition.

At step 712, the alpha mask is blurred. Such a blurring may occur with or without user input. The blur shading operation is conducted on each of the pixels in the mask. Such a blurring may replace each pixel with a weighted average of neighboring pixels of each pixel (e.g., via a Gaussian blur). The number of neighboring pixels that are averaged may be based on a kernel size. One or more kernel sizes may be determined and comprise a number of the pixels that fit into a given pixel shader. Further, a determination may be made regarding which of a selected set of kernel sizes produces the lowest error rate during rendering (e.g., does not result in an unacceptable level/speed during rendering). The number of neighboring pixels to use may be calculated based on the given/determined kernel size. Accordingly, the bitmap/alpha mask/accumulation buffer is blurred using a convolution kernel to simulate the degree to which liquid flows into adjacent areas of the drawing.

At step 714, the base stroke (e.g., the stroked fill or spline) is rendered on a display device in accordance with one or more parameters (e.g., user specified or default color and width).

At step 716, the wet color is rendered utilizing the alpha mask on top of the base stroke. In this regard, the alpha channel may be used to blend the spline rendered on the display with additional color in accordance with the multiple parameters.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

As described above, multiple passes are used to render a drawing that simulates a natural media material such as a marker stroke in a vector based software environment. One or more of the passes may be combined. For example, passes one and two. In this regard, as more powerful hardware is released, additional operations and passes may be performed or combined. For example, instead of two blurring operations (in the horizontal and vertical directions), one blur may be utilized.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for displaying a vector marker stroke, comprising:
    (a) obtaining, by a computer, a computer-generated rendering comprised of vector geometry and one or more pixels;
    (b) receiving, by the computer, user input via a cursor control device, wherein said user input comprises a marker stroke in the computer-generated rendering;
    (c) obtaining, by the computer, a stroked fill based on the marker stroke, wherein the stroked fill comprises one or more vector splines;
    (d) creating, by the computer, one or more vector polygons along the one or more vector splines, wherein each vector polygon comprises one or more faces;
    (e) creating, by the computer, a stencil buffer comprising a number, for each of the one or more pixels, of the one or more vector faces that are incident at each of the one or more pixels;
    (f) conducting, by the computer, a first rendering pass creating a mask comprising:
        (i) examining the number, in the stencil buffer, of each of the one or more pixels, to determine if each of the one or more pixels has overlapping faces; and
        (ii) if the number indicates that one of the one or more pixels has overlapping faces, executing a pixel shader for the one pixel as many times as the number, wherein the pixel shader determines an opacity value in the mask for the one pixel;
    (g) conducting, by the computer, a second rendering pass comprising:
        (i) examining, the number, in the stencil buffer, of each of the one or more pixels, to determine if each of the one or more pixels has one or more faces;
        (ii) if the number indicates that one of the one or more pixels has one or more faces, further determining if the one pixel is at a beginning or an ending of the marker stroke; and
        (iii) if the one pixel has one or more faces and is at the beginning or ending of the marker stroke, executing the pixel shader that adds to the opacity value in the mask for the one pixel;
    (h) performing, by the computer, one or more blur shading operations on each of the one or more pixels in the mask;
    (i) rendering, by the computer, the stroked fill on a display device in a first color; and
    (j) rendering, by the computer, a second color, using the mask, on top of the stroked fill on the display device.

2. The method of claim 1, wherein the creating the stencil buffer comprises:
    determining if each of the one or more pixels contains one of the one or more vector faces; and
    if one of the one or more pixels contains one of the one or more vector faces, conducting a stencil operation for each of the one or more faces contained at the one pixel, wherein the stencil operation increases a current value of the number for the one pixel.

3. The method of claim 1, wherein during the first rendering pass, the examining the number, in the stencil buffer, of each of the one or more pixels, to determine if each of the one or more pixels has overlapping faces comprises determining if the number is two (2) or more.

4. The method of claim 1, wherein during the second rendering pass:
the determining if the pixel is at the beginning or the ending of the marker stroke comprises using a UV coordinate of the pixel on the marker stroke to determine where on the vector marker stroke the pixel is located;
the executing of the pixel shader passes the UV coordinate to the pixel shader; and
the pixel shader compares the UV coordinate to a user specified parameter that determines how far bleeding goes into the marker stroke.

5. The method of claim 1, wherein the performing the one or more blur shading operations on the one or more pixels comprises replacing each pixel with a weighted average of neighboring pixels of each pixel.

6. The method of claim 5, wherein a number of neighboring pixels that are averaged is based on a kernel size, the method further comprising:
determining one or more kernel sizes comprised of a number of the one or more pixels that fit into the pixel shader;
determining which of the one or more kernel sizes produces a lowest error rate during rendering; and
calculating the number of neighboring pixels based on the determined kernel size.

7. An apparatus for displaying a vector marker stroke in a computer system comprising:
(a) a computer having a memory;
(b) an application executing on the computer, wherein the application is configured to cause the computer to perform a first series of steps that:
 (i) obtain a computer-generated rendering comprised of vector geometry and one or more pixels;
 (ii) receive user input via a cursor control device, wherein said user input comprises a marker stroke in the computer-generated rendering;
 (iii) obtain a stroked fill based on the marker stroke, wherein the stroked fill comprises one or more vector splines;
 (iv) create one or more vector polygons along the one or more vector splines, wherein each vector polygon comprises one or more faces; and
 (v) render, via local shader, the stroked fill on a display device in a first color;
(c) a global component executing on the computer, wherein the global component is configured to cause the computer to perform a second series of steps that:
 (i) create a stencil buffer comprising a number, for each of the one or more pixels, of the one or more vector faces that are incident at each of the one or more pixels; and
 (ii) conduct a first rendering pass creating a mask comprising:
  (1) examining the number, in the stencil buffer, of each of the one or more pixels, to determine if each of the one or more pixels has overlapping faces; and
  (2) if the number indicates that one of the one or more pixels has overlapping faces, executing a pixel shader for the one pixel as many times as the number, wherein the pixel shader determines an opacity value in the mask for the one pixel;
 (iii) conduct a second rendering pass comprising:
  (1) examining the number, in the stencil buffer, of each of the one or more pixels, to determine if each of the one or more pixels has one or more faces;
  (2) if the number indicates that one of the one or more pixels has one or more faces, further determining if the one pixel is at a beginning or an ending of the marker stroke; and
  (3) if the one pixel has one or more faces and is at the beginning or ending of the marker stroke, executing the pixel shader that adds to the opacity value in the mask for the one pixel;
 (iv) perform one or more blur shading operations on each of the one or more pixels in the mask; and
 (v) render a wet color, using the mask, on top of the stroked fill on the display device.

8. The apparatus of claim 7, wherein the stencil buffer is created by:
determining if each of the one or more pixels contains one of the one or more vector faces; and
if one of the one or more pixels contains one of the one or more vector faces, conducting a stencil operation for each of the one or more faces contained at the one pixel, wherein the stencil operation increases a current value of the number for the one pixel.

9. The apparatus of claim 7, wherein during the first rendering pass, the examining the number, in the stencil buffer, of each of the one or more pixels, to determine if each of the one or more pixels has overlapping faces comprises determining if the number is two (2) or more.

10. The apparatus of claim 7, wherein during the second rendering pass:
the determining if the pixel is at the beginning or the ending of the marker stroke comprises using a UV coordinate of the pixel on the marker stroke to determine where on the vector marker stroke the pixel is located;
the executing of the pixel shader passes the UV coordinate to the pixel shader; and
the pixel shader compares the UV coordinate to a user specified parameter that determines how far bleeding goes into the marker stroke.

11. The apparatus of claim 7, wherein the performing the one or more blur shading operations on the one or more pixels comprises replacing each pixel with a weighted average of neighboring pixels of each pixel.

12. The apparatus of claim 11, wherein a number of neighboring pixels that are averaged is based on a kernel size, the global component further configured to:
determine one or more kernel sizes comprised of a number of the one or more pixels that fit into the pixel shader;
determine which of the one or more kernel sizes produces a lowest error rate during rendering; and
calculate the number of neighboring pixels based on the determined kernel size.

* * * * *